United States Patent [19]

Bogenschutz et al.

[11] 4,291,789
[45] Sep. 29, 1981

[54] HYDRAULIC SLACK ADJUSTING APPARATUS

[75] Inventors: Thomas M. Bogenschutz, Clayton; Glen O. Bohusch, Watertown, both of N.Y.

[73] Assignee: General Signal Corporation, Stamford, Conn.

[21] Appl. No.: 95,884

[22] Filed: Nov. 19, 1979

[51] Int. Cl.³ .............................................. F16D 65/74
[52] U.S. Cl. ................................ 188/351; 188/196 A
[58] Field of Search .................. 188/196 A, 198, 347, 188/348, 351, 352; 303/89; 60/590

[56] References Cited

U.S. PATENT DOCUMENTS

| 2,928,508 | 3/1960 | Rockwell | 188/351 |
|---|---|---|---|
| 2,972,865 | 2/1961 | Orshansky | 60/590 |
| 3,161,024 | 12/1964 | Ryskamp | 188/351 |
| 3,425,750 | 2/1969 | Deane | 188/352 |
| 3,955,370 | 5/1976 | Engle | 188/196 A |

*Primary Examiner*—Edward R. Kazenske
*Attorney, Agent, or Firm*—Thomas R. FitzGerald; Jeffrey S. Mednick

[57] ABSTRACT

In a hydraulic brake system the fluid slack is maintained at a predetermined volume by a flow control valve that is positioned between a fluid reservoir and a slack adjusting cylinder. The flow control valve closes the fluid path to the reservoir after a chamber in the cylinder fills with a predetermined amount of slack fluid. The flow control valve can be held open with a detent mechanism to permit servicing of the brake system. The detent is automatically released when the brakes are applied.

7 Claims, 3 Drawing Figures

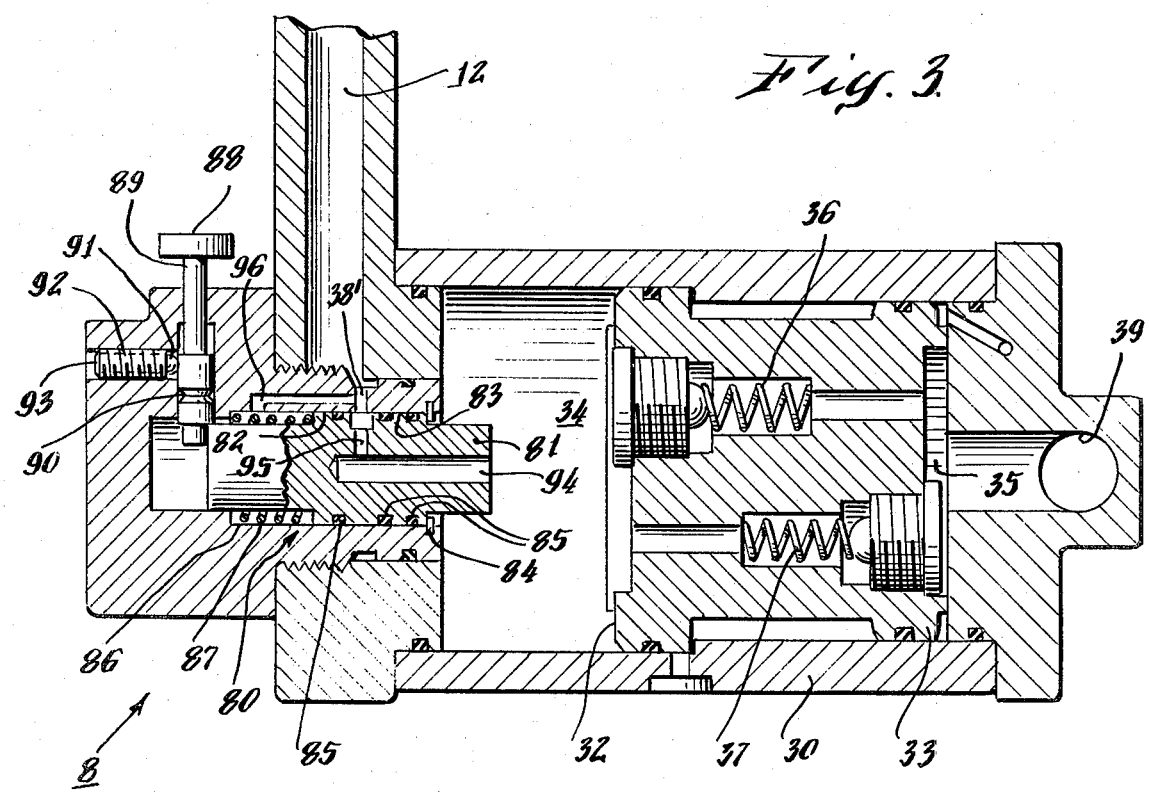

HYDRAULIC SLACK ADJUSTING APPARATUS

BACKGROUND

This invention relates to hydraulic brake control apparatus, and more particularly, to a take-in slack adjusting apparatus.

In U.S. Pat. No. 3,707,309, there is described a hydraulic brake system for railway rapid transit service which is known commercially as the PS-68 Brake Equipment, P.S.B.E., marketed by New York Air Brake Company, a Unit of General Signal Corporation. In that system, the brake cylinders on each truck are provided with a translating and valving unit of the type described in U.S. Pat. No. 3,622,207, granted Nov. 23, 1971, which joins these cylinders to a hand brake control unit and to a hydro-pneumatic booster assembly constructed in accordance with the preferred teachings of U.S. Pat. No. 3,513,656, granted May 26, 1970.

In such a braking system, it is desirable to have a small, predetermined amount of clearance between the brake shoe and its wheel. Hence, the system includes a provision for some amount of hydraulic fluid slack in the hydraulic braking circuit. It is critical that this hydraulic slack neither be too great nor too small. If the slack is too small, then the brake shoe may be in constant contact with the wheel resulting in an undesirable stuck brake condition. On the other hand, if there is too much hydraulic slack, then the shoe might not engage the brake upon operation of the hydro-pneumatic booster, thereby resulting in an undesirable brake failure. In U.S. Pat. No. 3,955,370, granted May 11, 1976, there is described a hydraulic slack adjuster which affords double-acting slack compensation so that it corrects for insufficient as well as excess shoe clearance during cycling of the brakes. In addition, that adjuster enables the shoe clearance to be increased intentionally during maintenance operations by cycling of the brakes.

That slack adjuster essentially includes a cylinder disposed between the hydraulic brakes and the hydro-pneumatic booster. The cylinder includes a differential piston which carries a double-acting check valve. During maintenance operations, the slack between the shoe and the wheel manually increased by retracting the brake cylinder with a pry bar. In effect, all one has to do is to apply a force to the brake shoe that results in a pressure high enough to open the check valve in the piston. Once the check valve is open, hydraulic fluid will drain out of the brake circuit thereby increasing shoe clearance.

Under severe winter conditions, it is possible that snow, ice or sleet may accumulate on the railway right-of-way. It is recommended practice that the right-of-way be cleared by appropriate plows. However, such accumulations may occur before a plow has had time to clear the right-of-way in which case the brake rigging may become a plowing or profile clearing device. When such a condition exists, it is possible that the accumulated snow or ice will cause a considerable force to be applied against the brake shoe thereby forcing open the check valve in the slack adjuster device and forcing an excess amount of fluid out of the brake lines. The hydro-pneumatic booster is only capable of applying a predetermined volume of hydraulic fluid for each service application. Hence, if the oil forced out of the brake lines exceeds the amount of applicable fluid, then these brakes will not be applied upon the initial service of the hydro-pneumatic booster. Under such conditions, it is recommended practice that the hydro-pneumatic booster be applied 2 or 3 times before an expected braking application can occur.

Since an operator or brakeman may fail to follow the recommended application, it would be desirable to have a slack adjusting apparatus which retains all of the desirable features of a double-acting slack adjuster as well as having means for limiting the amount of excess slack in a brake line.

SUMMARY OF THE INVENTION

It is an object of this invention to provide a new, useful and unobvious hydraulic slack adjusting apparatus.

It is another object of this invention to provide a hydraulic slack adjusting apparatus for limiting the amount of hydraulic slack in a hydraulic brake circuit.

It is a further object of this invention to provide a hydraulic slack adjusting apparatus having means for limiting the volume of oil returning from hydraulic cylinders to a predetermined volume.

In summary, the invention includes a cylinder having first and second chambers. The cylinder is interposed between the hydro-pneumatic booster and the hydraulic brake cylinders on a braking system. A reciprocating piston is moveably mounted within this cylinder dividing this cylinder into the first and second chambers. First and second ports are respectively operatively associated with the first and second chambers for permitting hydraulic fluid to enter and leave the chambers. The first pressure chamber is in fluid communication with the hydro-pneumatic booster and the second pressure chamber is normally in fluid communication with the hydraulic cylinders. A pressure responsive valve means, such as a ball check valve, is carried in the body of the reciprocating piston and is operable for establishing fluid communication between the first and second chambers when the fluid pressure in the second chamber exceeds fluid pressure in the first chamber by a predetermined pressure differential. The invention further includes means for closing the first port of the first chamber when the second chamber fills with a predetermined volume of hydraulic fluid. In that way, the fluid communication between the first and second chambers is terminated when the second chamber fills with that predetermined volume. The predetermined volume in the second chamber corresponds to the amount of slack desirable in the brake system. Hence, that volume should be large enough to provide sufficient slack but not so large as to require more than one application of the booster to apply the brakes.

More particularly, the second chamber of the cylinder is a control volume which allows a predetermined brake shoe clearance. When the brakes are released, fluid leaves the hydraulic brake cylinders and enters the second chamber. As oil fills the second chamber, the piston moves toward the opposite or first chamber. A flow control valve is disposed in or adjacent to the first port of the first chamber and in the path of the piston. As the piston travels toward the end of the first chamber, it engages the flow control valve thereby severing the fluid communication between the hydro-pneumatic booster and the first chamber. Hence, as pressure builds up in the second chamber as a result of ice or snow, it will not be possible to force any fluid past the first port.

The invention also includes means for opening the flow control valve in order to enable the service and inspection of the brake shoes. The opening means includes a detent which keeps the first port of the first chamber open regardless of the position of the piston. A further feature provides for automatically resetting the detent upon application of the hydro-pneumatic booster.

Having summarized the salient features of the invention, the reader is directed to the following detailed description of the preferred embodiment and its alternate construction which should be read in conjunction with the appended drawings.

DRAWINGS

FIG. 3 is a sectional view showing an alternate construction of the slack adjusting apparatus of the invention.

DETAILED DESCRIPTION

Figure 1:
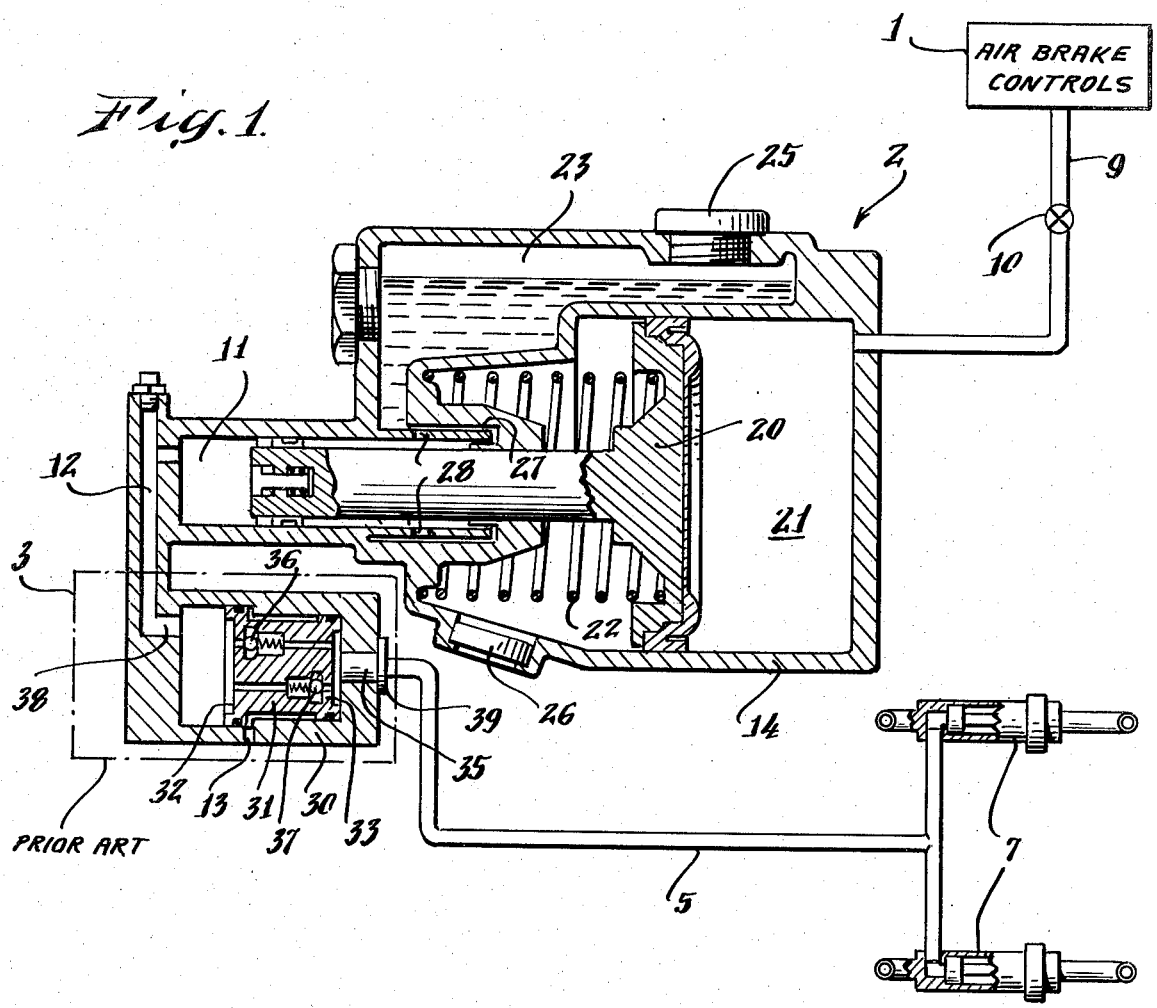
FIG. 1 is a schematic diagram of a brake system for one truck of a rapid transit car.
Figure 2:
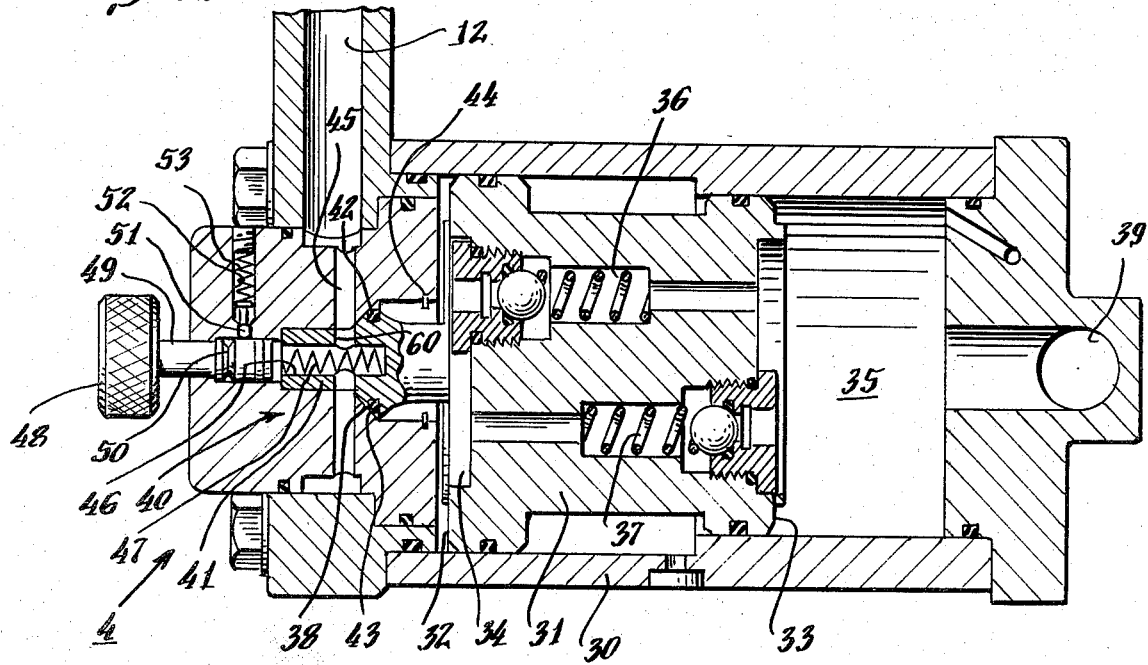
FIG. 2 is a sectional view of the hydraulic slack adjusting apparatus of the invention.

Referring to FIG. 1, there are shown air brake controls 1 for operating a hydro-pneumatic booster assembly 2 which includes a double-acting hydraulic slack adjuster unit 3 of the prior art which is in fluid communication via conduit 5 with two hydraulic brake shoe cylinders 7.

The air brake controls 1, which preferably incorporate the teachings of U.S. Pat. No. 3,536,360, granted Oct. 27, 1970, are connected with booster assembly 2 through a shut-off valve 10. Air brake controls 1 supply the booster assembly 2 with a pneumatic command pressure which is transduced into proportional hydraulic pressure which in turn actuates brake cylinders 7 during service braking application. Booster 2 comprises a hydraulic pump including a pneumatic cylinder 14 and a reciprocal piston assembly 20 which cooperate to define a pneumatic working chamber 21 and a hydraulic working chamber 11. Piston assembly 20 is normally biased to the right of working chamber 21 by pneumatic piston bias spring 22. Accordingly, hydraulic fluid in reservoir 23 may enter working chamber 11 via ports 28 on either side thereof. Likewise, fluid may reenter reservoir 23 through ports 28 or passageways 27.

A prior art slack adjuster apparatus 3 is in fluid communication with working chamber 11 via passageway 12. Slack adjuster unit 3 includes a hydraulic cylinder 30 that houses a differential dual acting piston 31. Piston 31 has a left hand face 32 which is slightly larger than its right hand hand face 33. Hydraulic fluid enters a first or left-hand chamber 34 via port 38 which is in fluid communication with hydraulic brake line 5 via a second port 39. Mounted in the body of hydraulic piston 31 are two oppositely disposed check valves 36, 37. Check valve 36 serves as a slack make-up check valve and valve 37 serves as a slack take-in or limiting control valve.

When a brake application is called for, pressurized air is directed via air brake controls 1 through shutoff valve 10 and pneumatic line 9 into working chamber 21 of the booster assembly 2. As the air pressure overcomes the biasing force of spring 22, the piston assembly 20 moves to the left and communication between the oil reservoir 23 and chamber 11 is cut off through supply ports 28. Hydraulic pressure starts to build in chambers 11 and 34 until the pressure overcomes the friction in slack adjuster piston 31. As piston 31 starts to move forward, pressure will continue to increase slightly in order to overcome resistance in brake cylinders 7 and their brake rigging. Piston assembly 20 and slack adjuster piston 31 continue to move until the brake shoes contact the car wheels. Then, hydraulic pressure in chambers 11, 34 and second chamber 35 build rapidly. When the pressure in chambers 11 and 34 exceed the pressure in chamber 35 by a predetermined amount (such as 15 psi), slack adjuster piston 31 moves to the position shown in the reference FIG. 1. When the hydraulic piston 31 reaches the end of the cylinder 30, the hydraulic pressure continues to build thereby unseating slack makeup check valve 36 thus allowing oil to flow to the brake cylinder 7 until a full brake shoe force is accomplished.

During a typical full service application, piston assembly 20 moves aproximately one and three quarter (1¾) inches, displacing approximately seven (7) cu. in. of oil to the brake cylinders 7. To compensate for pad wear which occurs during a brake application, piston assembly 20 will move forward displacing an additional amount of oil through the slack makeup check valve 36 to the brake cylinders. When the brakes are released, air pressure in chamber 21 is exhausted through line 9 and air brake controls 1 allowing piston assembly 20 to return to its release position. Thereupon, hydraulic pressure in chamber 11 is then reduced causing a pressure differential between chamber 11 and second chamber 35 of slack adjuster apparatus 3. This pressure differential occurs as a result of the back pressure of the brake shoe rigging on the hydraulic brake cylinders 7. The back pressure differential causes slack adjuster piston 31 to move to its left or release position.

During release, a measured amount of oil as determined by the volume of second chamber 35 is removed from the brake cylinder 7, which in turn controls the amount of shoe clearance. If shoe wear has occurred during the brake application, an additional amount of oil will have moved through the make-up check valve 22. However, during release, the measured volume of oil removed from the brake cylinders is controlled by second chamber 35. Therefore, as piston assembly 20 moves back to its full release position and slack adjuster piston 31 stops at its full release position and the system make-up check valve 24 (mounted in the end of piston assembly 20) opens to allow oil from sump 23 to flow into service chamber 11.

As is mentioned above, second chamber 35 is a controlled volume which allows a predetermined brake shoe clearance. In a typical brake apparatus, each brake cylinder 7 will have a cross section area of seven (7) square inches and will operate two brake shoes. If a desired brake shoe clearance is one quarter inch per shoe, then a total one inch stroke (for two cylinders) × a 7 sq. in. (area) will result in a displacement of seven (7) cu. in. of fluid. Hence the volume of second chamber 35 is chosen to be seven (7) cu. in.

As also mentioned above, under severe winter conditions, it is possible for the build up of snow, ice or sleet on the railway right-of-way to cause a force on the brake shoes. That force will be transmitted to the slack adjuster apparatus 3 via the hydraulic cylinder 7, brake line 5 and port 39. When that force due to ice or snow exceeds a pre-determined amount (for example, 2 psi), then slack relief check valve 37 will open thereby permitting fluid to leave the hydraulic line 5. Assuming further that the force of the ice or snow on the brake shoes will cause the two hydraulic cylinders 7 to collapse 2 inches each, then a total amount of 28 cu. in. of oil (7 sq. in./cyl. ×2 in. ×2 cylinders) would be returned to the hydraulic reservoir 23. Since the total output capacity of service chamber 11 is only 22 cu. in., it is readily apparent that a brake action cannot be accomplished since the amount of fluid available to move cylinders 7 (22 cu. in.) is less than the excess slack fluid (28 cu. in.) already displaced from the brake line 5. Accordingly, the slack adjuster apparatus 3 of the prior art may admit an excess amount of slack fluid from cylinders 7 into the hydraulic booster reservoir 23.

THE PREFERRED EMBODIMENT OF FIG. 2

The preferred embodiment of the invention overcomes the disadvantages of the prior art slack adjuster 3 by providing a new and useful slack adjuster apparatus having a flow control valve 40 disposed in the first chamber port 38. Flow control valve 40 has a moveable valve element 41 and a stationary seat 42. A seal 43 is carried on the moveable valve element 41 for engaging seat 42 thereby sealing off fluid communication through port 38. Flow control valve 40 further includes a bias spring 47 seated in a spring cavity 46. Spring 47 urges the valve element 41 to the right thereby normally establishing fluid communication through port 38. An opening 60 in spring cavity 46 provides fluid communication with passageway 45. A snap ring 44 is operatively disposed in the path of moveable element 41 in order to limit the movement thereof.

In operation, fluid pressure builds up in passageway 12 and internal passageway 45 thereby bearing against the moveable valve element 41. Accordingly, moveable valve element 41 is forced against piston 31 thereby urging slack adjuster piston 31 to the right. So long as pressure increases, the slack adjuster piston 31 operates as described above.

Upon release of the brakes, fluid pressure in passageway 12 falls off and a back pressure generated by the brake rigging on the hydraulic cylinders, urges slack adjuster piston 31 to the left. As the slack adjuster piston 31 reaches the end of its travel, the left hand face 32 engages moveable valve element 41 thereby seating the valve element 41 in valve seat 42. If pressure in second chamber 35 increases and exceeds the pressure in first chamber 34, then slack take in check valve 37 will open. However, no fluid will flow through first port 38 since the piston 31 (as well as back pressure against moveable valve element 41) will hold the moveable valve element 41 against valve seat 42, thereby sealing off first port 38. No excess hydraulic fluid will pass through first port 38 and the second chamber 35 will always be filled with a predetermined amount of hydraulic fluid (seven cu. in.) sufficient to maintain the predetermined amount of brake shoe clearance. Accordingly, the hydraulic fluid in service chamber 11 will be sufficient to supply the brakes on a service application of air brake controls 1.

The invention also provides for a means to manually open the flow control valve 40. This means includes a knob 48 coupled to an elongated stem 49. The stem 49 has a recess 50 for receiving a detent 51. Detent 51 is biased by a spring 52 that resides in spring cavity 53. When it is desirable to increase the brake shoe clearance beyond its normal ¼", an operator may press knob 41 thereby urging stem 49 against moveable valve element 41 to open the first chamber port 38. After detent 51 sets into recess 50, the first chamber port 38 can be held open by back pressure such as that generated by a serviceman who would pry back the brake shoes to increase the clearance for inspection or replacement purposes. Such back pressure would force past check valve 37 and through first port 38. Once the inspection or replacement is completed, the predetermined amount of slack is reintroduced into hydraulic line 5 by applying the air brake controls 1. Application of the air brake controls 1 also resets the detent 51. As oil pressure builds up in passageways 12 and 45 that pressure acts against the end of stem 49 via opening 60 in spring cavity 46 to overcome the force of detent spring 52.

DESCRIPTION OF THE ALTERNATE EMBODIMENT OF FIG. 3

The slack adjuster apparatus of FIG. 3 includes a spool-type flow control valve 80. Flow control valve 80 has a cylindrical shiftable spool 81 having a partial bore 94 through the center of spool 81. Bore 94 has a drilled orifice 95 that extends to the outside surface of spool 81. Spool 81 is biased in the position shown against snap ring 84 by a spring 87 which is contained in spring cavity 86. Hydraulic passageway 12 is terminated in a reduced first fluid port 38' which is also in fluid communication with another port 96 spaced therefrom. A raised land 82 on spool 81 is disposed between ports 96 and 38'. A second raised land 83, having O-ring seals 85 on each side thereof, serves to cut off communication between first port 38' and orifice 95 when the spool 81 is shifted to the left by slack adjuster piston 31. In operation, fluid pressure in passageway 12 is communicated against the annular surface of land 82 via port 96 thereby urging the spool 81 against the slack adjuster piston 91 until further communication is established directly through first chamber port 38', orifice 95, and partial bore 94.

The slack adjuster apparatus 8 also includes a knob 88 having an elongated stem 89 terminating in a finger 90 which is adapted to bear against one end of spool 81 in order to maintain the communication through first chamber port 38'. Stem 89 is held in position by a detent 91 which is urged against shoulder 90 by a bias spring 92 contained in spring cavity 93.

While there has been shown and described what is considered at present to be a preferred and an alternate embodiment of the invention, other modifications thereto will readily occur to those skilled in the art.

What is claimed is:

1. A hydraulic slack adjusting apparatus for controlling the slack fluid in a hydraulic circuit having a predetermined maximum slack, said apparatus comprising:
  (a) a cylinder having first and second variable volume pressure chambers, the maximum volume of said second chamber defining the predetermined maximum slack fluid in the hydraulic circuit;
  (b) first and second ports respectively operatively associated with the first and second chambers for permitting fluid to enter and leave the respective chambers;
  (c) a reciprocating piston movably mounted within the cylinder and dividing the cylinder into the first and second chambers;
  (d) a normally closed slack makeup valve for opening and establishing fluid communication between the first and second chambers when fluid pressure in the first chamber exceeds fluid pressure in the second chamber by a first predetermined pressure differential so that additional fluid can flow from the first port through the second port in order to add fluid when the slack fluid is less than the predetermined amount;

(e) a normally closed slack take-in valve for opening and establishing fluid communication between the first and second chambers when fluid pressure in the second chamber exceeds fluid pressure in the first chamber by a second predetermined pressure differential so that fluid can be withdrawn from the hydraulic circuit in order to increase the maximum slack therein; and (f) a hydraulic slack limiting valve for selectively preventing or permitting the withdrawal of more than said predetermined maximum amount of slack fluid including a stationary valve seat disposed between the first port and the first chamber, and a movable valve element having a sealing surface for engaging said stationary valve seat in a fluid tight seal to prevent fluid from flowing between the first chamber and the first port when the movable valve element is seated on said stationary valve seat, said movable valve element being spring biased away from said stationary valve seat, toward said piston and extending into said first chamber in the path of said piston in order to allow fluid in the first chamber to freely pass through the first port, whereby said movable valve element is acted upon and moved by said piston as said piston moves adjacent said first port and sealingly engages said stationary valve seat before said slack take-in valve can open thereby preventing more than the predetermined amount of slack fluid from being withdrawn from the circuit, and means for acting upon said movable valve element to hold said sealing surface thereof disengaged from said stationary valve seat irrespective of the position of said piston, thereby permitting more than the predetermined amount of fluid to be withdrawn from the hydraulic circuit when the take-in valve opens.

2. The apparatus of claim 1 wherein the stationary valve seat is conical and the sealing surface has a corresponding conical sealing surface for seating in said conical stationary valve seat.

3. The apparatus of claim 1 wherein the hydraulic slack limiting valve includes an annular bore, said first port is a transverse passageway opening in said bore, said stationary valve seat being the annular area of said bore circumscribing said passageway opening, and the movable valve element being a bypass valve including an elongated shiftable spool disposed between the first port and the first chamber and extending into the first chamber in the path of said piston, said spool having a raised land as said sealing surface for overlapping said annular area circumscribing said passageway opening thereby closing off said passageway opening when the piston engages the end of the spool and shifts the spool to register the raised land with said passageway opening.

4. The apparatus of claim 1 wherein said means acting upon said movable valve element includes an elongated stem moveable between a first position where one end of said stem acts upon said movable valve element to hold said sealing surface of said moveable valve element disengaged from said stationary valve seat irrespective of the position of said piston and a second position for allowing said sealing surface to engage said stationary valve seat as said piston acts upon said movable valve element.

5. The apparatus of claim 4 further comprising detent means for releasably holding said elongated stem in one of said two positions.

6. The apparatus of claim 4 further comprising means for automatically moving said elongated stem from said first position to said second position.

7. The apparatus of claim 6 wherein the automatic moving means comprises a fluid passage means disposed in said hydraulic slack limiting valve, said passage means being in fluid communication with said first port and with said one end of said stem for applying hydraulic fluid pressure at said first port to said one end of said elongated stem to thereby act upon said stem and move said stem from said first position to said second position.

* * * * *